Figure 1:
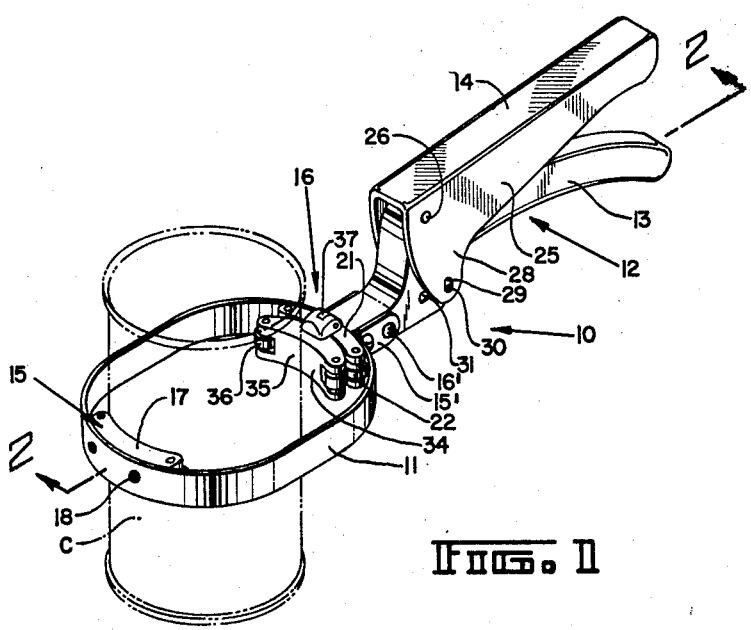

Dec. 15, 1959   S. D. BLUE   2,917,338
CAN HOLDERS
Filed March 26, 1957

INVENTOR.
SIDNEY D. BLUE
BY
ATTORNEY.

United States Patent Office 2,917,338
Patented Dec. 15, 1959

2,917,338

CAN HOLDERS

Sidney D. Blue, Larchmont, N.Y.

Application March 26, 1957, Serial No. 648,585

13 Claims. (Cl. 294—31.2)

This invention relates to hand operated holding or gripping devices in general and more particularly to a gripping device which enables the user thereof to grip cylindrical objects of various diameters and which permits rotation of the object while it is otherwise being firmly held.

The study of food and human nutrition is a relatively new science but enough research has been done since the turn of the century to have brought about great improvement in the quality of our national diet. Dietary deficiencies are steadily being corrected and the nutritional value of our foods is being increased and better retained by modern marketing and packaging methods. As evidence of the above, one can point to the marked increases in the height and weight of the average American male over the last 50 years.

Closely related to this improvement in our nutrition is the progress that has been made in the field of food processing. The changing pattern of life in our and other industrial nations has caused a shift from rural to urban living and with it the need for the year around distribution of prepackaged foods and less reliance on home grown or bulk produce. An indication of this change is the statistical fact that since 1929, while our per capita consumption of fresh vegetables was rising about 10 to 20 percent, our per capita consumption of canned vegetables was rising about 40 percent. Competition for the market provided by the increased consumption of canned foods has forced improvements not only in the methods of processing but also in the quality of the fresh produce that is to be canned. A salutary result, from the standpoint of the nutritive value of the product, is that perishable foods are now processed and stabilized within a few hours after they are harvested.

While the canners have been constantly improving the flavor and nutritional quality of their product little or nothing has been done to enable the housewife to handle the canned product in her kitchen so as to retain the maximum of flavor and nutritional value when she serves the product to her family.

All processed raw foods are cooked at the cannery. After it has been washed, trimmed, cut to desired size, and blanched in the case of some raw produce, the food is packed in a sterile can sometimes with a small quantity of brine added. The can is hermetically sealed and placed in a retort or pressure cooker. Temperatures range from 212° F. to about 250° F., and processing or cooking time varies from a few minutes to about two hours. After processing the cans are quickly cooled and are labeled, if necessary, and packed in cartons ready for distribution.

When the canned product is to be served it should only be re-heated to proper serving temperature. No additional cooking is required. In fact, canners use labels bearing the instructions "Do not overheat," "Heat and serve," "Place contents in double boiler and heat gently," "Heat slowly over low flame," and the like. The purpose of such instructions or admonitions is to preserve the full flavor of the food. The ideal method for achieving maximum flavor, texture, and nutritive retention is to re-heat the food in the can in which it is contained. If the can is placed in boiling water for a few minutes to bring the temperature of the contents up to proper serving temperature no harm can come to the can or the product since it has already been subjected to higher temperature at the cannery. By heating the can in boiling water, the can becomes the equivalent of the upper receptacle of a double boiler. After heating in this manner the can is opened and the contents served. It is obvious that all of the food values are thus retained by such a method of preparation for serving.

Unfortunately this method cannot be conveniently used at present because of the absence of any device for holding a heated can for opening and serving. Housewives or cooks who know the benefits derived from heating foods in the unopened can have tried makeshift means for removing the can from the hot water, such as, dish cloths, spoons and the like, but because of the danger of injury therefrom, by scalding or otherwise, they have been discouraged from taking advantage of such benefits. Thus, it is the general practice of the average housewife to open the can and pour off most of the liquid, which contains much of the soluble nutrients, and then heat the remaining contents in an open saucepan over direct heat. In so doing, she further depletes the nutritional value by distilling off into the atmosphere some of the volatile nutrients and flavor essence. Furthermore, she must be vigilant to avoid scorching the food and must be ready to serve it before further evaporation takes place. After the meal, there is the unnecessary chore of washing the saucepans used for heating the canned portion of the meal.

By re-heating the food in its can and serving from the latter, the washing of pots may be avoided. Furthermore, if there is a delay in the serving of the meal, no deterioration results from keeping the canned food at serving temperature for several minutes unopened in the can.

Therefore, it is an object of this invention to provide an implement which will enable the user to grip a heated can and, while thus holding it, to place it in position for opening by any can opener including those which revolve the can during the opening process.

The great majority of canned foods packed for home consumption that require re-heating before serving are generally put up in cans varying in diameter from 2$^{11}/_{16}$ inches to 3$^{7}/_{16}$ inches. To be practical any can holding device must be adjustable to fit all sizes.

Therefore, it is a further object of this invention to provide a can holding device that will instantly and automatically adjust to the can diameter without the need for making manual adjustments to the holder.

As mentioned heretofore the preferred method for re-heating canned food is by placing the can in hot or boiling water. For placing the can in the water and removing it therefrom it is necessary to use a gripper having a hand held portion disposed at a sufficient distance from the can gripping portion so that the user's hand does not come into contact with the heated can or the hot water in which it is heated. This invention provides such a gripper and furthermore serves as a separable handle for the can so that the latter may be held in one hand while a plate or spoon may be held in the other for the purpose of dishing or serving.

In accordance with an aspect of this invention, a can gripping implement includes a handle portion extending from a supporting portion that carries gripping assemblies facing toward each other and engageable with a can at diametrically opposed sides of the latter, with one of the gripping assemblies being movable toward and away from the other of the gripping assemblies, in response to manipulation of the handle portion, for gripping and releasing, respectively, a can disposed between the gripping assemblies.

Further, each of the gripping assemblies preferably has rollers projecting therefrom for rolling engagement with the gripped can so that the latter may be freely rotated with respect to the gripping implement, thereby facilitating the opening of the gripped can by openers of the kind which revolve the can during the opening process.

In accordance with another aspect of the invention, one of the gripping assemblies of the can gripping implement has a first gripping element and a second gripping element which is hingedly mounted on the first gripping element to swing upwardly from an operative position, wherein the second element is disposed at the side of the first element facing toward the other of the gripping assemblies to cooperate with the latter in gripping a can therebetween, to an inoperative position, wherein the second element is disposed above the first element to permit the latter to cooperate with the other gripping assembly in gripping a can therebetween, so that, in gripping cans of relatively small diameter, the second gripping element will be disposed in its operative position and, when the supporting portion of the implement is moved downwardly onto a can of relatively large diameter, the upper rim of such can will engage the second gripping element and swing the latter to its inoperative position.

Figure 2:
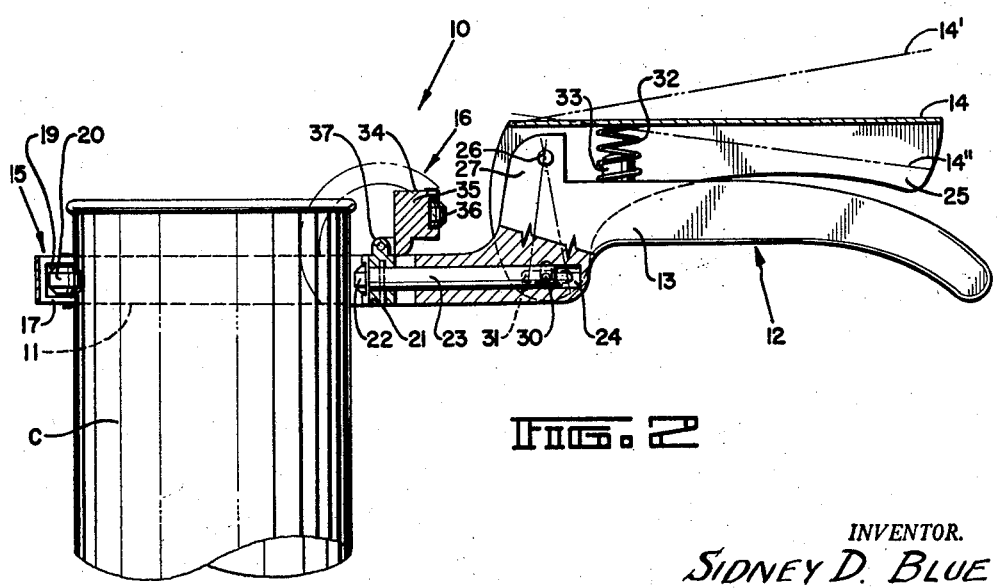

The above, and other objects, features and advantages of this invention, will be apparent in the following detailed description of an illustrative embodiment thereof which is to be read in connection with the accompanying drawing forming a part hereof, and wherein:

Fig. 1 is a perspective view of a can gripping implement embodying the present invention which is shown gripping a can of relatively small diameter appearing in broken lines therein; and Fig. 2 is an enlarged longitudinal sectional view taken along the line 2—2 of Fig. 1.

Referring to the drawing in detail, it will be seen that a can gripping implement embodying the present invention, and there generally identified by the reference numeral 10, includes a support portion 11, and a handle portion 12 having an elongated rigid part 13 extending from the support portion 11 and an actuating member 14 rockably mounted on the part 13.

The support portion 11 may be formed of a strip or band of stainless or corrosion resistant spring steel which is bent into a substantially oval formation and has its end portions 15' (Fig. 1) extending along the opposite sides of an end portion of the rigid handle part 13 and secured to the latter by screws 16', rivets or the like. Thus a can C or other cylindrical object to be gripped by the implement 10 may be received within the open space defined by support portion 11.

In order to grip the can C within the support portion 11, the implement 10 further includes gripping assemblies 15 and 16 facing each other, preferably along the relatively long axis of the oval formation of the support portion.

The gripping assembly 15 includes an arcuate rigid body 17 secured against the inside surface of support portion 11, as by screws 18 (Fig. 1), and having recesses 19 (Fig. 2) opening at its concave inner surface to receive rollers 20 which are mounted within body 17 for rotation about axes perpendicular to the plane of support portion 11. The rollers 20 project out of the recesses 19 of body 17 for rolling contact with the cylindrical surface of a can C or the like gripped between the assemblies 15 and 16.

The gripping assembly 16 also includes an arcuate rigid body 21 having rollers 22 rotatably mounted within recesses thereof and projecting from the related body for rolling contact with the cylindrical surface of the can C.

In order to provide for gripping and releasing of the can C between the assemblies 15 and 16, at least one of the gripping assemblies is mounted for movement toward and away from the other of such assemblies. Thus, in the illustrated embodiment of the invention, the body 21 of assembly 16 is secured to one end of a plunger 23 (Fig. 2) which is longitudinally slidable in a bore 24 formed in the handle part 13 and opening at the end of the band or strip forming the support portion 11, the plunger 23 is connected to the actuating member 14, as will hereinafter be described in detail, so that the plunger will be axially displaced relative to handle part 13 in response to rocking of member 14 relative to the latter.

The actuating member 14 may be of inverted U-shaped cross-section and have depending side skirts 25 which are spaced apart by a distance greater than the width of handle part 13 so that the side skirts 25 can loosely embrace handle part 13, as is clear in Fig. 1. The pivot for the actuating member 14 consists of a pin 26 which is carried by an upstanding lug 27 on handle part 13 and which is received in suitable openings in the skirts 25 adjacent the end of member 14. The skirts 25 are extended downwardly, in the form of ears 28, at the pivotally mounted end of actuating member 14, and the ears 28 are formed with openings 29 (Fig. 1) which are elongated in the direction extending radially with respect to the rocking or pivoting axis of member 14. A pin 30 extends diametrically through the end portion of plunger 23 remote from the body 21 of assembly 16, and the opposite ends of the pin 30 pass through slots 31, which open outwardly from the opposite sides of bore 24 and are elongated in the direction of the longitudinal axis of the latter, with the ends of the pin 30 being received in the openings 29 of skirts 25 to provide the desired connection between actuating member 14 and plunger 23.

As seen in Fig. 2, a helical compression spring 32 is interposed between handle part 13 and actuating member 14 to urge the latter angularly away from handle part 13, thereby to retract plunger 23 into the bore 24, and a guide projection 33 may extend from the top of handle part 13 into spring 32 to hold the latter in operative position between part 13 and member 14.

It will be apparent that, when actuating member 14 is free to move angularly away from handle part 13 under the influence of spring 32, for example, to the position represented by the broken line 14' of Fig. 2, the body 21 of gripping assembly 16 will be moved against the adjacent end of handle part 13, thereby to provide a maximum clearance between the gripping assemblies 15 and 16 for the reception of a can C therebetween. However, when the part 13 and member 14 are jointly grasped and squeezed together, the actuating member is moved angularly toward the handle part 13, for example, toward the position represented by the broken line 14" of Fig. 2, and the plunger 23 is extended from bore 24 to move gripping assembly 16 toward gripping assembly 15, thereby to engage the rollers 20 and 22 with the can C therebetween for securely holding the latter while permitting rotation of the can about its central axis.

It will be apparent the movement of gripping assembly 16 toward gripping assembly 15 will be limited by the engagement of the connecting pin 30 with the left-hand ends (as viewed in Fig. 2) of the slots 31. Thus, if the gripping assembly 16 is provided only with the body 21, the largest can that can be accommodated within support portion 11 and gripped between assemblies 15 and 16 will have a diameter which is less than the diametrical distance between the rollers 20 and 22 with the body 21 resting against the adjacent end of handle part 13, while the smallest can capable of being gripped will have to have a diameter larger than the diametrical distance between the rollers 20 and 22 when the plunger 23 is extended its maximum distance out of the bore 24.

In order to extend the range of the diameters of cans that may be handled with the implement 10, at least one of the assemblies 15 and 16, for example, the assembly 16, as shown, includes a second gripping element 34, in addition to the first gripping element defined by the described body 21 and rollers 22. The second gripping element 34 has a rigid arcuate body 35 and rollers 36 projecting from the latter, and a hinged connection 37 is provided between the bodies 21 and 35 so that the body 35 is swingable about an axis extending laterally along the top of body 21 for movement between the operative position of Fig. 1, wherein the body 35 is disposed alongside the body 21 and faces toward the gripping assembly 15, and the inoperative position of Fig. 2, wherein the body 35 is disposed above the body 21 and avoids interference with the engagement of the rollers 22 with a can positioned within support portion 11 between the gripping assemblies 15 and 16.

When a can of relatively small diameter is to be gripped with the implement 10, the second gripping element 34 is moved to its operative position (Fig. 1), thereby to reduce the maximum and minimum limits of the diametrical distance between the gripping assemblies 15 and 16. However, when a can having a diameter greater than the maximum diametrical distance between the gripping assemblies 15 and 16 with the element 34 in its operative position is to be gripped, it is only necessary to move the support portion 11 downwardly over such can, whereupon, the upper rim of the can will engage the underside of body 35 to cause upward swinging of the element 34 to its inoperative position, as represented in Fig. 2, so that the maximum and minimum limits of the diametrical distance between the assemblies 15 and 16 will be correspondingly increased. Thus, the implement is automatically adjusted to accept the larger can.

It will be obvious that, by reason of the rollers 22 and 36 carried by the bodies 21 and 35, respectively, the gripped can will be free to revolve, in either position of the second or auxiliary gripping element 34 of assembly 16, so that, while the can is safely and securely held by the implement the top of the can may be conveniently removed using an opener of the type that revolves the can during the opening process.

With the above described implement, it is a simple matter to remove an unopened can from a pot of boiling water, to hold the can during the opening thereof, and then to carry or manipulate the opened can during the serving or dispensing of the contents thereof. Thus, the dangers and inconveniences previously associated with the heating of canned foods directly in the can have been removed, thereby making it possible to attain the full benefits and advantages of that method of heating of canned foods, as previously described in detail herein.

Although a particular embodiment of this invention has been described in detail herein with reference to the accompanying drawing, it is to be understood that the invention is not limited thereto, and that various changes and modifications may be effected in that embodiment without departing from the scope or spirit of the invention, except as defined in the appended claims.

What is claimed is:

1. An implement for gripping and transporting cans of the described character; comprising supporting means in the form of a closed loop, of constant circumference to substantially embrace the article, a plurality of confronting gripping members carried by said supporting means at opposite sides of said loop and having rollers for engagement with a can to be gripped therebetween at opposed sides of the can while permitting free rotation of the latter, a handle portion rigidly secured to said supporting means to permit manual transporting of the latter, and means operative to effect the movement of at least one of said gripping members relative to said loop in directions toward and away from the other of said gripping members for respectively gripping and releasing an article disposed between said gripping means.

2. An implement for gripping and transporting cylindrical articles; comprising first and second gripping means, supporting means in the form of a closed loop and having said first and second gripping means mounted thereon at opposite sides of the loop in confronting relationship for receiving an article to be gripped therebetween, a handle portion rigidly secured to said supporting means and by which the implement can be manually transported, said first and second gripping means having freely rotatable rollers projecting from the confronting sides thereof for rolling engagement with the surface of a cylindrical article disposed therebetween, and manually actuable means operative to effect the movement of at least one of said gripping means toward and away from the other of said gripping means for causing said rollers to respectively grip and release a cylindrical article disposed between said gripping means, whereby a cylindrical article can freely rotate with respect to said supporting means and handle portion while gripped by said rollers of the gripping means.

3. An implement for gripping and transporting articles of the described character; comprising first and second gripping means, supporting means in the form of a closed loop and having said first and second gripping means mounted thereon at opposite sides of the loop in confronting relationship for receiving an article to be gripped therebetween, a handle portion rigidly secured to said supporting means and by which the implement can be manually transported, and means operative to effect the movement of at least one of said gripping means toward and away from the other of said gripping means for respectively gripping and releasing an article disposed between said gripping means, at least one of said gripping means having an auxiliary part movably mounted thereon to alternatively occupy an operative position at the side of said one gripping means facing toward said other gripping means and an inoperative position above said one gripping means, so that, articles of relatively small and large lateral dimensions differing by more than the extent of the movement of said one gripping means are adapted to be gripped between said first and second gripping means with said auxiliary part in said operative and inoperative positions, respectively.

4. An implement for gripping and transporting articles of the described character; comprising support means having a closed loop of constant circumference defining a space that is open at the top and bottom for the reception of an article therein and having a handle portion rigidly extending therefrom by which the implement can be manually transported, first and second gripping elements carried by said supporting means at the opposite sides of said loop and facing each other across said space, and means operative to effect the movement of at least one of said gripping elements relative to said loop in directions toward and away from the other of said gripping elements for respectively gripping and releasing an article disposed between said gripping elements in said space.

5. An implement for gripping and transporting articles of the described character; comprising support means including a closed loop defining a space that is open at the top and bottom for the reception of an article therein and having a handle portion rigidly extending therefrom by which the implement can be manually transported, first and second gripping elements carried by said supporting means at opposite sides of said loop and facing each other across said space, and manually actuable means operative to effect the movement of at least one of said gripping elements toward and away from the other of said gripping elements for respectively gripping and releasing an article disposed between said gripping elements in said space, said gripping elements having freely rotatable rollers projecting from the confronting sides thereof for engagement with the gripped article so that, when the article is cylindrical, it can freely revolve in said space while being otherwise firmly gripped.

6. An implement for gripping and transporting articles of the described character; comprising support means including a closed loop defining a space that is open at the top and bottom for the reception of an article therein and having a handle portion rigidly extending therefrom by which the implement can be manually transported, first and second gripping elements carried by said supporting means at opposite sides of said loop and facing each other across said space, and means operative to effect the movement of at least one of said gripping elements toward and away from the other of said gripping elements for respectively gripping and releasing an article disposed between said gripping elements in said space, at least one of said gripping elements having an auxiliary part hingedly mounted thereon to swing upwardly from an operative position, disposed at the side of said one gripping element facing toward the other of said gripping elements, to an inoperative position above said one gripping element, so that, with said auxiliary part in said operative position, an article having relatively small lateral dimensions can be gripped between said gripping elements and said auxiliary part and the latter is moved to its inoperative position by the entry into said space from below of an article having relatively large lateral dimensions, thereby to accommodate such relatively large article between said gripping elements.

7. An implement for gripping and transporting cylindrical cans and the like; comprising a support member including a closed loop defining a space that is open at the top and bottom for the reception of a can therein with the axis of the can extending perpendicular to the plane of said loop of the support member, a handle extending fixedly from said support member and by which the implement can be manually transported, a first gripping element secured within said loop of the support member, a second gripping element within said loop and confronting said first element across said space, means mounting said second gripping element on said support for rectilinear movement in the directions toward and away from said first element, an actuating member, means rockably mounting said actuating member on said handle, and mechanical connecting member between said actuating means and said mounting means of the second element to effect said rectilinear movement of the latter in response to rocking of said actuating member relative to said handle for gripping and releasing a can extended into said space.

8. An implement as in claim 7; wherein said loop of the support member consists of a band of relatively stiff spring metal having its opposite ends rigidly secured to an end of said handle, and each of said first and second gripping elements includes an arcuate rigid body disposed at the inside of said band with the concave side of the arcuate body facing toward the center of said space so that, when said second gripping element is moved toward said first gripping element, said band of spring metal permits slight angular displacement of the rigid body of said first gripping element with respect to the rigid body of said second gripping element to ensure uniform gripping engagement of said first and second gripping elements with a can in said space.

9. An implement as in claim 8; wherein each of said gripping elements further includes rollers projecting from the concave side of the related arcuate body and rotatable about axes perpendicular to said plane of said loop of the support member, whereby, when said second gripping element is moved toward said first gripping element to grip a can in said space, said rollers effect rolling contact with the surface of the gripped can to permit the latter to revolve.

10. An implement as in claim 8; wherein said second gripping element further includes a rigid, arcuate auxiliary part hingedly mounted on the related arcuate body to swing between an operative position at the concave side of said related body and an inoperative position above said related body and disposed radially outwardly with respect to said concave side of the latter so that, with said auxiliary part in its operative position, the maximum and minimum distances between said first and second gripping elements are reduced to permit the gripping of cans having relatively small diameters, and so that, when a can having a relatively large diameter is extended upwardly into said space, the top of such relatively large can engages said auxiliary part from below to swing the latter to its inoperative position for accommodating the relatively large can between said gripping elements.

11. An implement as in claim 10; wherein each of said first and second gripping elements further includes rollers projecting from the concave side of the related arcuate body and said second gripping element also includes rollers projecting from the concave side of said arcuate auxiliary part so that a can gripped between said first and second elements is engaged by said rollers with said auxiliary part in said operative and inoperative positions, thereby to permit the gripped can to revolve in said space.

12. An implement as in claim 7; wherein said mounting means for the second gripping element includes a plunger extending from the latter in the direction away from said first gripping element, said handle having a longitudinal bore opening at the end of the handle extending toward said loop and slidably receiving said plunger; and wherein said mechanical connecting means includes a pin extending diametrically through said plunger, said handle further having longitudinal slots opening laterally from said bore and slidably receiving said pin, and said actuating member having openings therein spaced radially from the rocking axis of the actuating member, said openings being radially elongated and receiving the ends of said pin projecting through said slots of the handle.

13. An implement as in claim 7; wherein said mechanical connecting means moves said second gripping element toward and away from said first gripping element in response to rocking of said actuating member toward and away from, respectively, said handle; and further comprising spring means urging said actuating member to rock in the direction away from said handle for normally spacing said second gripping element a relatively large distance from said first gripping element so that a can may be inserted in, and removed from, said space, and so that said second gripping element is moved toward said first gripping element for gripping a can therebetween, in response to squeezing together of said actuating member and handle.

References Cited in the file of this patent

UNITED STATES PATENTS

| | | |
|---|---|---|
| 673,191 | Arthur | Apr. 30, 1901 |
| 702,919 | Boyd et al. | June 24, 1902 |
| 850,409 | Ward | Apr. 16, 1907 |
| 956,128 | Mimmack | Apr. 26, 1910 |
| 981,857 | Hubbard et al. | Jan. 17, 1911 |
| 1,142,198 | Niec | June 8, 1915 |
| 2,381,563 | Switzer | Aug. 7, 1945 |
| 2,392,865 | Smith | Jan. 15, 1946 |
| 2,395,140 | Peterson | Feb. 19, 1946 |
| 2,675,132 | Susil | Apr. 13, 1954 |
| 2,790,669 | Crawford | Apr. 30, 1957 |
| 2,786,707 | Campbell | Mar. 26, 1957 |